United States Patent [19]
Wiorek

[11] Patent Number: 5,515,397
[45] Date of Patent: May 7, 1996

[54] PCM SUBCODE COMMUNICATIONS TECHNIQUE BETWEEN A REGIONAL RADIO TRANSMITTER/RECEIVER AND A REGIONAL SWITCHING CENTER

[75] Inventor: Jonas Wiorek, Stockholm, Sweden

[73] Assignee: Telefonaktiebolaget LM Ericsson, Stockholm, Sweden

[21] Appl. No.: 203,610

[22] Filed: Feb. 28, 1994

Related U.S. Application Data

[63] Continuation of Ser. No. 717,653, Jun. 19, 1991, abandoned.

[51] Int. Cl.$^6$ .................................................. H04B 14/04
[52] U.S. Cl. ......................... 345/216; 345/242; 349/58; 455/54.1
[58] Field of Search ......................... 375/5, 25; 379/58, 379/59, 60; 455/33.1, 54.1, 55.1, 45, 101; 381/31; 370/77

[56] References Cited

U.S. PATENT DOCUMENTS

| | | | |
|---|---|---|---|
| 3,922,497 | 11/1975 | Artom et al. | 375/5 |
| 4,041,393 | 8/1977 | Reed | 375/5 |
| 4,131,849 | 12/1978 | Freeburg et al. | 455/54.1 |
| 4,143,242 | 3/1979 | Horiki | 370/84 |
| 4,377,860 | 3/1983 | Godbole | 375/5 |

FOREIGN PATENT DOCUMENTS

| | | |
|---|---|---|
| 0113662 | 7/1984 | European Pat. Off. |
| 2168878A | 6/1986 | United Kingdom. |

Primary Examiner—Stephen Chin
Assistant Examiner—T. Ghebretinsae
Attorney, Agent, or Firm—Burns, Doane, Swecker & Mathis

[57] ABSTRACT

In a radiotelephone network, processing steps previously applied to digital voice transmissions received by a regional radio transmitter/receiver but not applied to analog voice transmissions received by the transmitter/receiver are applied to such analog voice transmissions at the transmitter/receiver itself such that analog voice transmissions and digital voice transmissions may be transmitted identically between the regional radio transmitter/receiver and a regional switching center. In particular, a digital speech encoder/compressor and a corresponding digital speech decoder/decompressor (together referred to as a codec) provided at remote transmitter/receivers and the regional switching center are also provided at the regional radio transmitter/receiver so as to apply the same processing to analog voice transmissions received from the remote transmitter/receivers as is applied to digital voice transmissions at the remote transmitter/receivers.

15 Claims, 5 Drawing Sheets

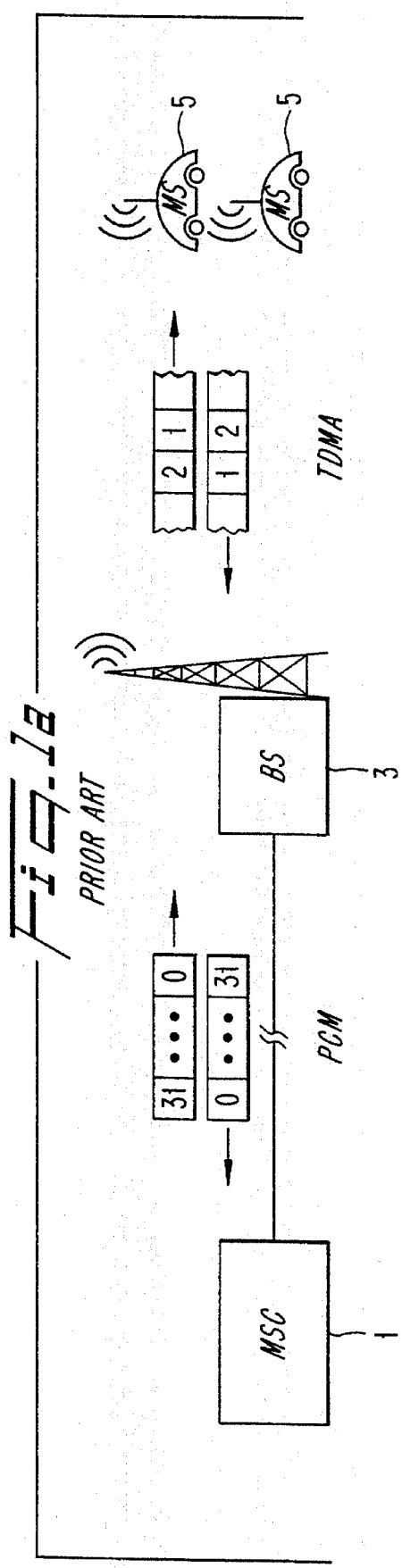
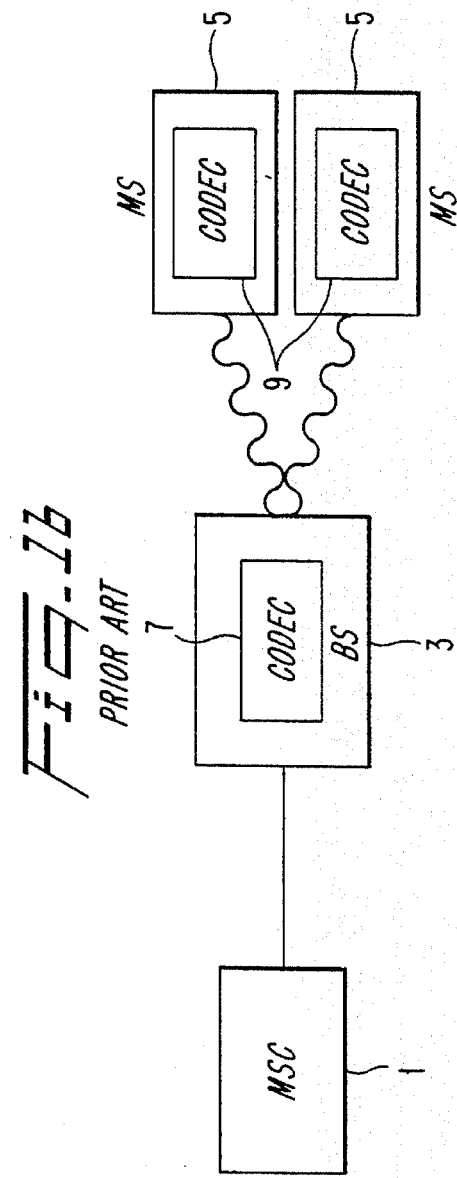

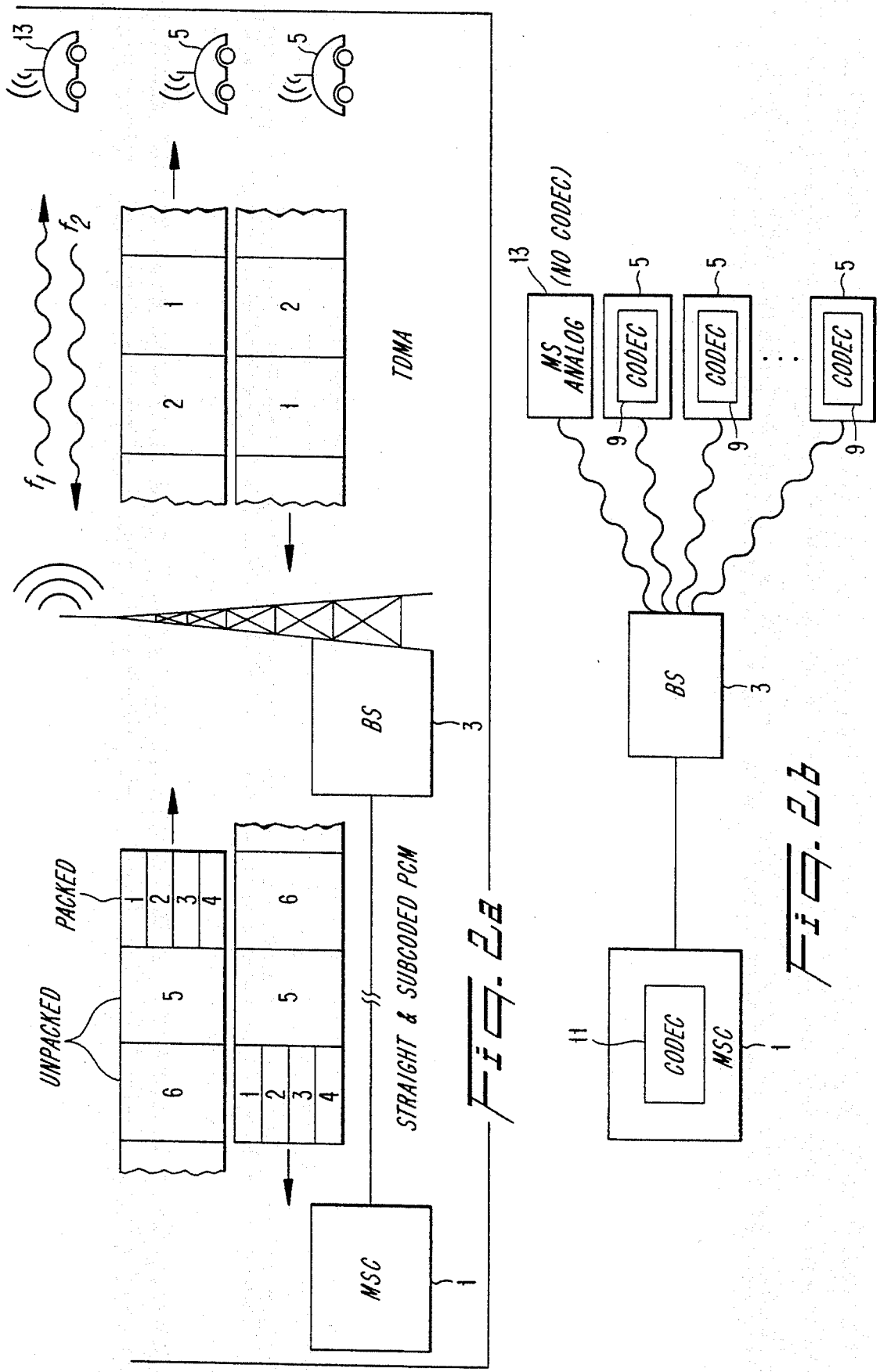

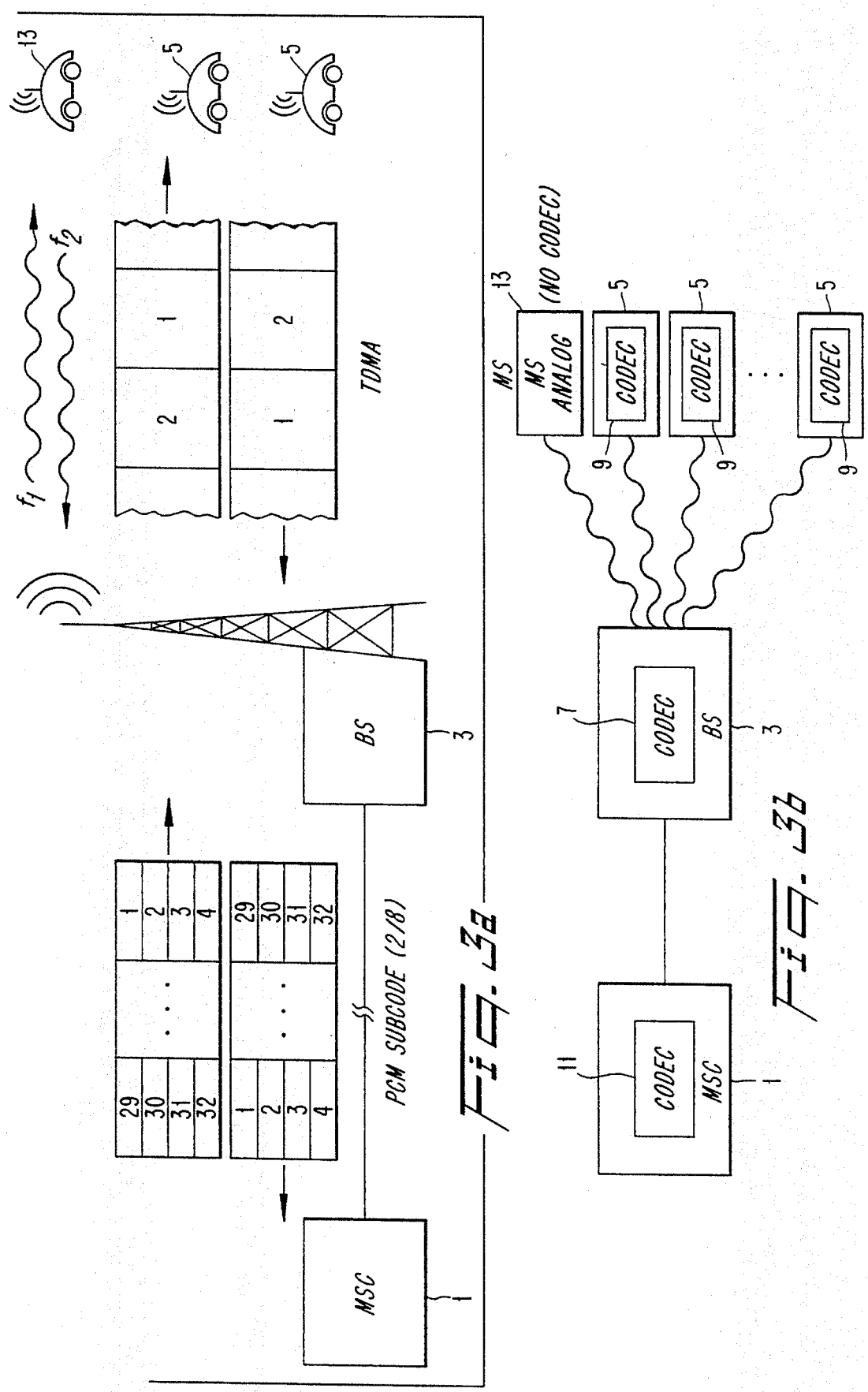

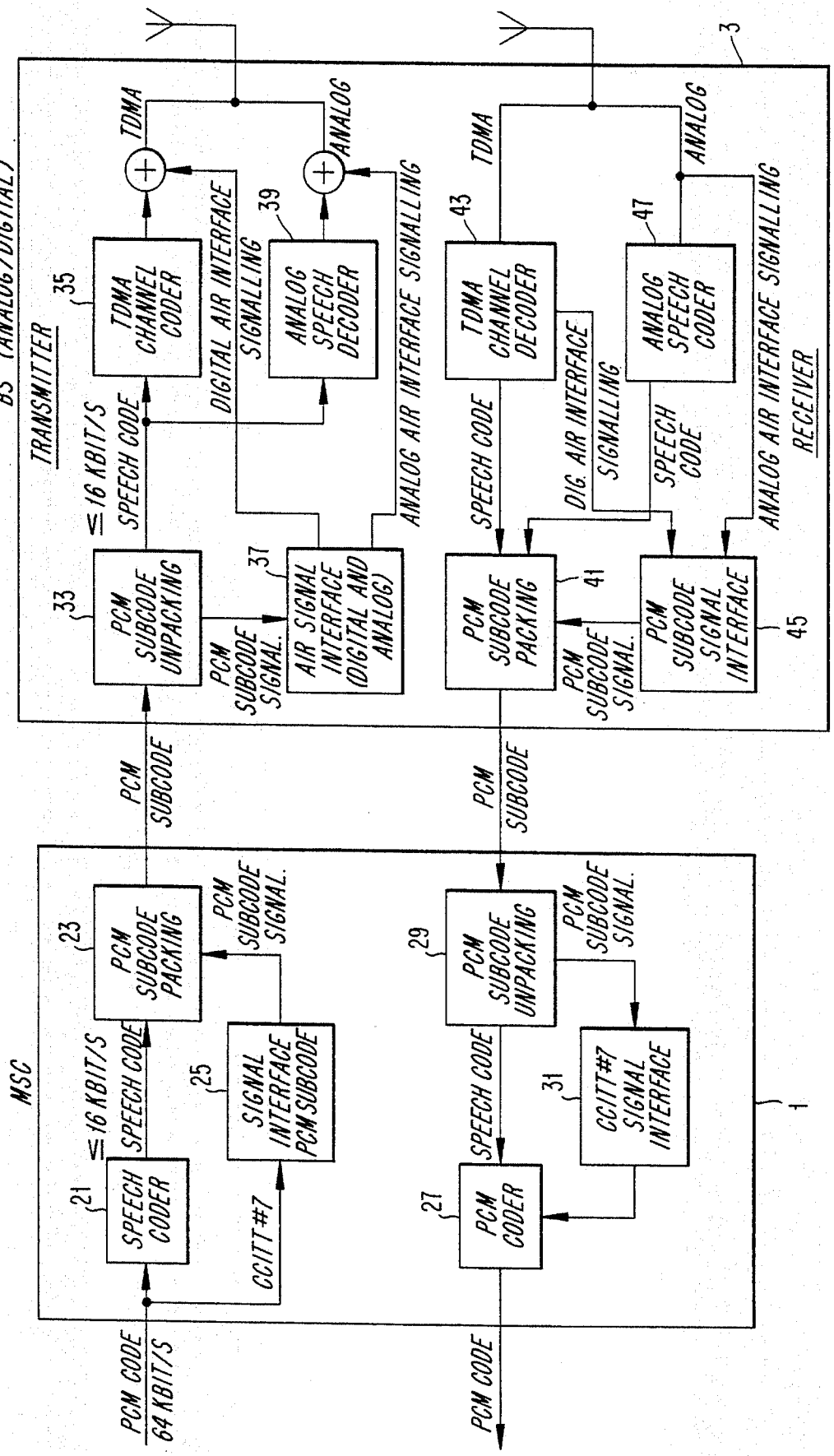

PCM SUBCODE COMMUNICATIONS TECHNIQUE BETWEEN A REGIONAL RADIO TRANSMITTER/RECEIVER AND A REGIONAL SWITCHING CENTER

This application is a continuation of application Ser. No. 07/717,653, filed Jun. 19, 1991, abandoned.

BACKGROUND OF THE INVENTION

The present invention relates to a radiotelephone communications system and more particularly to a communications technique between a regional radio transmitter/receiver and a regional switching center in such a system whereby transmission efficiency may be increased and transmission costs reduced while at the same time simplifying the handoff process.

Conventionally, radiotelephone networks have been analog in nature, system channels being defined by separate radio frequencies upon which speech information is impressed using, for example, frequency modulation. In recent years, however, attention has shifted toward digital radiotelephone networks. The main advantage of a digital implementation is more efficient utilization of the frequency spectrum by using the same frequency for more than one call (TDMA). Other advantages of a digital implementation include robustness of communications, lower cost and power consumption, and lighter more compact equipment. In Europe, a separate radiotelephone network is being implemented for digital users. In the United States, however, it has been determined that radiotelephone networks shall be both analog and digital-capable.

The different nature of analog and digital communications gives rise to special problems in hybrid systems required to handle both. Under certain circumstances, it may become necessary to change a user from a digital radio channel to an analog radio channel without changing regional radio transmitter/receivers. Changing channels is known as "handoff". For example, since digital radio channels are more susceptible to time dispersion than analog radio channels, if the time dispersion on the digital radio channel becomes too great, and no other suitable digital radio channel is available, it may be necessary to handoff the user from a digital radio channel to an analog radio channel. Such handoffs create special problems for communications between the regional radio transmitter/receiver and the regional switching center.

SUMMARY OF THE INVENTION

According to the present invention, processing steps previously applied to digital voice transmissions received by a regional radio transmitter/receiver but not applied to analog voice transmissions received by the transmitter/receiver are applied to such analog voice transmissions at the transmitter/receiver itself such that analog voice transmissions and digital voice transmissions may be transmitted identically between the regional radio transmitter/receiver and a regional switching center. In particular, a digital speech encoder/compressor and a corresponding digital speech decoder/decompressor (together referred to as a codec) provided at remote transmitter/receivers and the regional switching center are also provided at the regional radio transmitter/receiver so as to apply the same processing to analog voice transmissions received from the remote transmitter/receivers as is applied to digital voice transmissions at the remote transmitter/receivers.

BRIEF DESCRIPTION OF THE DRAWINGS

FIG. 1, including FIGS. 1a–1c, is a representation of a conventional digital radiotelephone system using TDMA wherein a full PCM channel is devoted to each digital call;

FIG. 2, including FIGS. 2a–2b, is a representation of a proposed modification of the system of FIG. 1 wherein four digital calls are packed into a single PCM channel;

FIG. 3, including FIGS. 3a and 3b, is a representation of a preferred embodiment of the present invention wherein four calls, digital and/or analog, jointly occupy a single PCM channel on the land interface between the regional receiver and the regional switching center; and FIG. 4 is a more detailed block diagram of the system of FIG. 3.

DETAILED DESCRIPTION OF THE PREFERRED EMBODIMENT

Figure 1C:
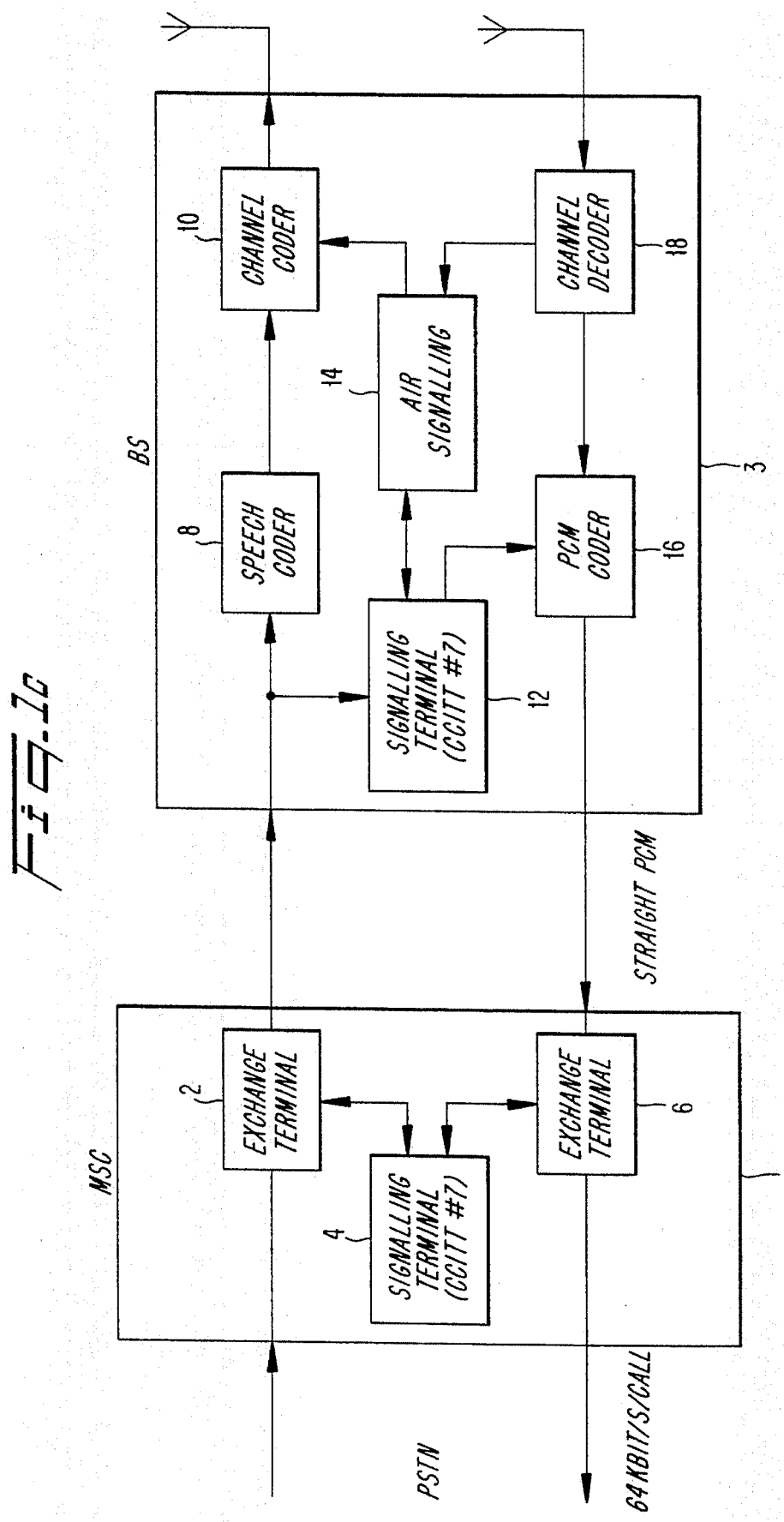

A typical radiotelephone system has three main components including a regional switching center, commonly referred to as a mobile services switching center or mobile telephone switching office, a regional radio transmitter/receiver, commonly referred to as a radio base station, and a plurality of remote transmitter/receivers. In the case of a mobile radiotelephone system, the remote transmitter/receivers are mounted in a vehicle or hand-carried such that the location of the remote transmitter/receiver is variable instead of fixed. In such a case, the remote transmitter/receiver is referred to as a mobile station. Two interfaces may be identified between the three main system components, namely a so-called "air interface" between the base station and the mobile stations, and a so-called "land interface" between the base station and the mobile services center. Although the land interface typically takes the form of hard-wired cables, or trunks, in exceptional cases it may also be realized using fixed radio links.

Referring now to FIG. 1a, in a conventional digital mobile radiotelephone system, the air interface is structured according to the TDMA (time division multiple access) principle wherein a single frequency is divided into time intervals, or time slots, each time slot realizing a separate channel for communication with a single mobile station 5. One frequency may therefore be used to carry a number of outgoing channels and another frequency may be used to carry a number of incoming channels. A similar principle (TDM, or time division multiplex) is applied to communications between the base station 3 and the mobile services center 1 on the land interface. In a typical case, 32 channels may be established between the base station 3 and the mobile services center 1 on a single PCM link.

Since human speech is inherently analog in nature, means must be provided to transform analog speech to a convenient digital pulse stream representation, and vice versa. Speech coders/decoders, or "codecs", are well-known in the art and have been provided for the foregoing purpose. Besides coding and decoding speech, the codec also removes redundant information, resulting in a compressed signal that may be more easily transmitted.

Speech may be represented in three different ways in different parts of the radiotelephone system, as an analog signal, as PCM code, or as speech code. PCM code is obtained by sampling an analog speech signal and representing each sample by a digital word of a predetermined number of bits. Speech coding may be of a number of well-known types such as VSELP (Vector-Sum Excited Linear Predictive Coding). Conversion from analog speech to PCM code, from analog speech to speech code, and from PCM to speech code is performed in different parts of the system as required. For example, PCM code received from the PSTN is converted into speech code in the MSC in an all-digital manner. Also, in accordance with the present invention as explained more particularly below, analog speech signals received from an analog mobile station are converted into speech code in the base station in direct digital fashion.

Referring to FIG. 1b, codecs (7,9) have conventionally been provided in the mobile stations 5 and in the base station 3 only. In the downlink direction, therefore, PCM-coded speech transmitted on the land interface from the MSC 11 to the base station 3 has been speech-coded by the codec 7 in the base station 3 and transmitted on the air interface to a mobile station 5 where the coded speech has been decoded by the codec 9. In the uplink direction, speech coded by the codec 9 in the mobile station is subsequently decoded by the codec 7 in the base station and transmitted to the MSC 11 in PCM code.

The "local speech coding mode" in accordance with FIG. 1b is illustrated in greater detail in FIG. 1c, showing those parts of the apparatus essential for an understanding of the underlying communications principles. Blocks omitted for simplicity include a group switch and multiplexer for routing calls between the PSTN and the base station, radio equipment, and error detection/error handling circuitry.

In a so-called local speech coding mode, communications between the public switching telephone network (PSTN) and the mobile services center (MSC) 1 are carried out in PCM code at a rate of 64 kbit/s/call. The MSC 1 and the base station (BS) 3 are connected by ordinary PCM links carrying a single call per PCM channel. Control communications between the MSC and the BS are carried out in both directions according to the CCITT7 protocol across a predetermined PCM channel. Accordingly, at appropriate intervals, the signalling terminal block 4 in the MSC 1 inserts control communications in the data stream to the BS 3 by means of an exchange terminal 2 and likewise receives control communications from the BS 3 by means of a corresponding exchange terminal 6. Otherwise, PCM-coded calls pass unchanged through the MSC to the PSTN. Similarly, the signalling terminal 12 in the BS 3 inserts and receives control communications to and from the MSC 1 at appropriate intervals. Control communications between the base station 3 and the mobile station itself are exchanged between the signalling terminal 12 in the base station 3 and the air signalling block 14, where they are placed in or extracted from the prescribed slot format for communications between the base station 3 and the mobile station. Outgoing communications are coded by a channel coder 10 making error detection and correction possible and incoming communications are decoded by a corresponding channel decoder 18. Speech communications in the down-link direction are processed by a speech coder 8 prior to channel coding and transmission to the mobile station. In the up-link direction, speech received from the mobile station, having been decoded by the channel decoder 18, is converted to PCM in a PCM coder 16 for transmission to the MSC 1.

More recently, it has been proposed to relocate the codec from the base station 3 to the mobile services center 1 so that physical connections on the land side may be increased by packing four calls into one PCM channel on the land interface as represented in FIG. 2a. According to this arrangement, two out of eight bits of a PCM word are assigned to each of the calls. Such a technique is referred to in the present specification as PCM subcoding. As a result, channel density on the land interface side may be increased by a factor of four. Packing and unpacking is carried out in the base station to convert communications to and from the regular TDMA format. Packing and unpacking are likewise carried out in the MSC at the other end of the land interface to convert to and from ordinary PCM. The resulting system is shown in FIG. 2b wherein the codec 11 is now located in the mobile services center 1.

As previously mentioned, it has been decided that in the United States the large number of analog mobile subscribers and the growing number of digital mobile subscribers shall be served by the same system. Analog mobile stations such as the mobile station 13 in FIG. 2 are not provided with codecs, and the air interface between the analog mobile stations and the base station 3 is arranged according to frequency division; that is, each mobile station transmits and receives on a separate frequency. The base station has no capability except to convert these analog transmissions into digital by pulse code modulation, so that the converted analog transmissions remain space-inefficient as compared to the compressed digital transmissions. As a result, whereas digital calls may be packed four to a PCM channel between the base station 3 and the mobile services center 1, analog calls require a full PCM channel between the base station 3 and the mobile services center 1. Accordingly, in a mixed analog/digital system as illustrated in FIG. 2, transmission on the land interface between the base station 3 and the mobile services center 1 must be carried out in a hybrid format, part straight PCM corresponding to analog calls and part subcoded PCM corresponding to digital calls. The result is inefficient and more costly transmission.

Particular problems arise during intracell handoff from a digital channel to an analog channel in the case of a dual-capability mobile station. Since digital channels are more susceptible to time dispersion than analog channels, a digital channel may become unacceptably degraded. If no other digital channel is available, handoff to an analog channel may be required. Suddenly, a call that previously required only one quarter of a PCM channel between the base station 3 and the mobile services center 1 now requires a full PCM channel.

Referring now to FIGS. 3a and 3b, the foregoing problems and inefficiencies may be avoided by the present invention wherein codecs (7,11) are provided in both the base station 3 and the mobile services center 1. Whereas digital calls need only be converted to PCM subcode in the base station 3 for transmission to the mobile services center 1, analog calls are converted, encoded and compressed in the codec 7 at the base station 3, essentially transforming them into digital calls, and then converted to PCM subcode. All of the calls therefore uniformly require only one quarter of a PCM channel on the land interface between the base station 3 and the mobile services center 1. What were previously analog calls may therefore be packed side-by-side with digital calls according to the previously-mentioned PCM subcode wherein two out of eight bits of a PCM word are assigned to each call.

Referring to FIG. 4, the system of the present invention will now be described in greater detail. For simplicity of description, elements not essential to an understanding of the present invention have been omitted such as a modulator and demodulator, equalizer, combiner, etc.

Transmission will first be described in the down-link direction, i.e., from the public switch telephone network (PSTN) to the mobile station, after which transmission in the up-link direction from the mobile station to the PSTN will then be described. As in the prior art, transmission between the PSTN and the MSC 1 is done in straight PCM code, for example at a rate of 64 kbit/s. Call information is encoded in the speech coder 21 of the MSC, compressing the call information by a factor of four to 16 kbit/s or less. Four calls may then be packed into a single PCM channel in the PCM subcode packing block 23. Transmission between the MSC 1 and the BS 3 is therefore done in subcoded PCM, still at a rate of 64 kbit/s but with a single channel carrying four calls.

Signalling information (as opposed to call information) exchanged between the PSTN, the MSC 1 and the BS 3, normally transmitted according to the CCITT7 protocol in a designated PCM channel (for example, channel 16), is transmitted in like manner but in a designated subcoded PCM channel. For this purpose, signalling information from the PSTN is converted to PCM subcode signalling in the PCM subcode signal interface block 25 of the MSC 1 and sent to the PCM subcode packing block 23 for packing into a subcoded PCM channel. The PCM subcoded information stream is received and unpacked in the BS 3 in the PCM subcode unpacking block 33, and the signalling information is separated from the information stream. Call information is forwarded to either the TDMA channel coder (35 (digital call) or the analog speech decoder 39 (analog call) in the form of speech code of 16 kbit/s or less, and the PCM subcoded signalling information is provided to an air signal interface block 37 of both analog and digital capabilities. The air signal interface 37 provides digital air interface signalling to be suitably combined in the TDMA signalling path to form a communications slot of a format prescribed by the IS-54 standard. The air signal interface 37 also produces analog air interface signalling for suitable combination in the analog signal path as is well known in the art. The TDMA signal path and the analog signal path may be combined using a combiner so as to share a single antenna.

In the up-link direction, substantially the opposite sequence of events occur. Digital air interface signalling and analog air interface signalling are distinguished and input to a PCM subcode signal interface 45 to produce a PCM subcode signal for packing in the PCM subcode packing block 41. The digital air interface signalling information is first decoded in the TDMA channel decoder 43 for error detection and correction. Digital speech information is decoded in the TDMA channel decoder 43, resulting in speech code which is then input to the PCM subcode packing block 41. Analog speech information is first coded in an analog speech coder 47, resulting in speech code which is likewise input to the PCM subcode packing block 41. Digital and analog speech and signalling information are therefore packed side-by-side and sent to the MSC 1 using PCM subcode. At the MSC, PCM subcode unpacking is performed in PCM subcode unpacking block 29 to produce speech code and PCM subcoded signalling information. The signalling information is input to the CCITT7 signal interface 31. Signalling information to be sent to the PSTN is input from the CCITT7 signal interface to the PCM coder 27 along with the unpacked speech code. This information is combined and coded into conventional PCM code for transmission to the PSTN.

By means of the present invention, PCM subcode may be used uniformly between the MSC and the BS to provide the equivalent transmission capability of four conventional PCM channels. Furthermore, the same result may be obtained with respect to a base station that handles both digital and analog calls and regardless of the proportion of digital to analog calls.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A communications technique for enhancing transmission efficiency in a radiotelephone network having at least plural remote transmitters, a regional receiver, and a regional switching center, comprising the steps of:

processing voice communications at one of said remote transmitters for time division, speech compressed digital transmission to said regional receiver;

sending analog voice communications from one of said remote transmitters to said regional receiver;

receiving said analog voice communications at said regional receiver; and processing said analog voice communications at said regional receiver essentially identically as said processing of voice communications at said one of said remote transmitters for time division, speech compressed digital transmission to said regional receiver, such that such digital transmission and processed analog voice communications can be forwarded to said regional switching center as speech compressed digital transmissions.

2. The communications technique of claim 1 comprising the further step of essentially identically processing at said regional switching center the analog voice communications as such communications are processed by said regional receiver for digital transmission.

3. A communications technique for enhancing transmission efficiency in a radiotelephone network having at least plural remote transmitters, a regional receiver, and a regional switching center, comprising the steps of:

processing voice communications at one of said remote transmitters for time division, speech compressed digital transmission to said regional receiver;

sending analog voice communications from one of said remote transmitters to said regional receiver;

receiving said analog voice communications at said regional receiver; and processing said analog voice communications at said regional receiver essentially identically as said processing of voice communications at said one of said remote transmitters for time division, speech compressed digital transmission to said regional receiver, such that said digital transmission and said processed analog voice communications can be forwarded to said regional switching center as speech compressed digital transmissions, wherein the analog voice communications as processed at said regional receiver and the digital transmission are forwarded to said regional switching center using a PCM subcode wherein each of the analog voice communications as processed by said regional receiver and the digital transmission are assigned an equal number of bits in a PCM word, said number of bits being less than and an integral divisor of the number of bits in said PCM word.

4. A radiotelephone communications system having plural remote transmitters, a regional receiver and a regional switching center, comprising:

means for processing voice communications at one of said remote transmitters for time division, speech compressed digital transmission to said regional receiver;

means for sending analog voice communications from one of said remote transmitters to said regional receiver;

means for receiving processed analog voice communications at said regional receiver; and means for processing said analog voice communications at said regional receiver essentially identically as said processing of voice communications at said one of said remote transmitters for time division, speech compressed digital transmission to said regional receiver, such that said digital transmission and processed analog voice communications can be forwarded to said regional switching center as speech compressed digital transmissions.

5. The radiotelephone communications system of claim 4 wherein said means for processing said voice communications at one of said remote transmitters for digital transmission to said regional receiver and said means for processing said analog voice communications at said regional receiver are speech codecs.

6. The radiotelephone communications system of claim 5 wherein said regional switching center includes a speech codec.

7. The radiotelephone communications system of claim 6 wherein each of said speech codecs complies with the standard prescribed for digital radio communications in the United States.

8. A radiotelephone communications system having plural remote transmitters, a regional receiver and a regional switching center, comprising:

means for processing voice communications at one of said remote transmitters for time division, speech compressed digital transmission to said regional receiver;

means for sending analog voice communications from one of said remote transmitters to said regional receiver;

means for receiving analog voice communications at said regional receiver; and means for processing said analog voice communications at said regional receiver essentially identically as said processing of voice communications at said one of said remote transmitters for time division, speech compressed digital transmission to said regional receiver, such that said digital transmission and said processed analog voice communications can be forwarded to said regional switching center as speech compressed digital transmissions, wherein communications between said regional receiver and said regional switching center are formatted according to a PCM subcode wherein an equal number of bits in each PCM word are assigned to each of a plurality of radio channels including both analog and digital radio channels.

9. A method for enhancing transmission efficiency of processing communications in a radiotelephone communications system, the system including at least a regional switching center, a regional receiver, a first remote transmitter which transmits digital communications to the regional receiver, and a second remote transmitter which transmits analog communications to the regional receiver, the method comprising the steps performed by said regional receiver of:

transforming said analog communications into digitized communications having substantially the same format as said digital communications;

forwarding the digitized communications and the digital communications to said regional switching center using a PCM subcode wherein each of the digitized communications and the digital communications are assigned an equal number of bits in a PCM word, said number of bits being less than and an integral divisor of the number of bits in said PCM word; and processing, in said regional switching center, said digitized communications and said digital communications.

10. A radiotelephone communications system for enhancing transmission efficiency, comprising;

a regional switching center;

a regional receiver;

a first remote transmitter which transmits digital communications to the regional receiver; and a second remote transmitter which transmits analog communications to the regional receiver, said regional receiver including means for transforming said analog communications into digitized communications having substantially the same format as said digital communications wherein said transforming means comprises a speech codec and means for forwarding said digitized communications and said digital communications to said regional switching center using the same format.

11. The radiotelephone communications system of claim 10 wherein said regional switching center includes a second speech codec.

12. The radiotelephone communications system of claim 11 wherein said speech codec and said second speech codec comply with the standard prescribed for digital radio communications in the United States.

13. A radiotelephone communications system for enhancing transmission efficiency, comprising:

a regional switching center;

a regional receiver;

a first remote transmitter which transmits digital communications to the regional receiver; and a second remote transmitter which transmits analog communications to the regional receiver, said regional receiver including means for transforming said analog communications into digitized communications having substantially the same format as said digital communications and means for forwarding said digitized communications and said digital communications to said regional switching center as digitized communications, wherein said transforming means includes means for formatting said digitized and said digital communications between said regional receiver and said regional switching center according to a PCM subcode wherein an equal number of bits in each PCM word are assigned to each of a plurality of radio channels including both analog and digital radio channels.

14. A communications method for enhancing transmission efficiency in a radiotelephone network having at least plural remote receivers at least one of which is an analog receiver and at least one of which is a digital receiver capable of receiving time division speech compressed signals, a regional receiver, and a regional switching center, said method, in a transmission direction from said regional switching center to at least one of said plural remote receivers, comprising the steps of:

receiving, in said regional switching center, PCM-call information at a first transmission rate;

compressing, in said regional switching center, said PCM-call information from said first rate to a second, lower rate;

packing, in said regional switching center, into a single PCM-channel a number of calls of said PCM-call information substantially corresponding to a ratio between said first and said second transmission rates, and transmitting said calls as subcode PCM at said first transmission rate;

unpacking, in a regional receiver, said single PCM-channel into said number of calls; and separating at least one of said calls intended for said at least one analog remote receiver and processing said at least one call into an analog voice radio communication for said at least one analog remote receiver and processing at least one other of calls in said PCM-channel into time division speech compressed digital transmission for said at least one digital remote receiver.

15. A communications method for enhancing transmission efficiency in a radiotelephone network having at least plural remote transmitters at least one of which is an analog transmitter and at least one of which is a digital transmitter capable of transmitting time division speech compressed signals, a regional receiver, and a regional switching center, said method, in a transmission direction from at least one of said plural remote transmitters to said regional switching center, comprising the steps of:

receiving, in said regional receiver, analog voice communications from at least one analog remote transmitter and time division speech compressed digital transmissions from at least one digital remote transmitters;

processing, in said regional receiver, said analog voice communications from said at least one analog remote transmitter essentially identically to voice communications from at least one digital remote transmitter using a time division speech compressed digital transmission format;

packing, in said regional receiver, into a single PCM-channel processed analog voice communications and said time division speech compressed digital transmissions; and transmitting said processed analog voice communications and said digital transmission as speech compressed digital transmissions at a predetermined rate to said regional switching center.

\* \* \* \* \*